(12) United States Patent
Washburn

(10) Patent No.: US 8,036,141 B2
(45) Date of Patent: Oct. 11, 2011

(54) APPARATUS AND METHOD FOR MANAGING A NETWORK

(75) Inventor: Raymond Washburn, Allenwood, NJ (US)

(73) Assignee: AT&T Intellectual Property I, L.P, Atlanta, GA (US)

( * ) Notice: Subject to any disclaimer, the term of this patent is extended or adjusted under 35 U.S.C. 154(b) by 308 days.

(21) Appl. No.: 12/192,686

(22) Filed: Aug. 15, 2008

(65) Prior Publication Data

US 2010/0040073 A1 Feb. 18, 2010

(51) Int. Cl.
 *H04L 12/28* (2006.01)
 *H04L 12/56* (2006.01)
(52) U.S. Cl. ............ 370/254; 370/389; 370/395.31
(58) Field of Classification Search .......... 370/389, 370/395.31, 254
 See application file for complete search history.

(56) References Cited

U.S. PATENT DOCUMENTS

| 2001/0043602 | A1* | 11/2001 | Brown | 370/392 |
|---|---|---|---|---|
| 2004/0006640 | A1* | 1/2004 | Inderieden et al. | 709/242 |
| 2004/0109457 | A1* | 6/2004 | Johnson et al. | 370/401 |
| 2005/0201302 | A1 | 9/2005 | Gaddis et al. | |
| 2005/0254438 | A1* | 11/2005 | Turk et al. | 370/254 |
| 2006/0171404 | A1* | 8/2006 | Nalawade et al. | 370/401 |
| 2006/0200580 | A1* | 9/2006 | Wool | 709/238 |
| 2007/0008953 | A1* | 1/2007 | Wing et al. | 370/352 |
| 2007/0025355 | A1* | 2/2007 | Cohen et al. | 370/392 |
| 2007/0153763 | A1* | 7/2007 | Rampolla et al. | 370/351 |
| 2008/0098127 | A1* | 4/2008 | Engel | 709/238 |
| 2008/0288656 | A1* | 11/2008 | Forrester | 709/238 |

* cited by examiner

*Primary Examiner* — Marsha D Banks Harold
*Assistant Examiner* — Saad Hassan
(74) *Attorney, Agent, or Firm* — Guntin Meles & Gust PLC; Pablo Meles

(57) ABSTRACT

A system that incorporates teachings of the present disclosure may include, for example, a server comprising a controller to capture routing data representative of routing changes associated with a plurality of networks, and compare the routing changes to detect discrepancies in route lists associated with the plurality of networks. Other embodiments are disclosed.

24 Claims, 10 Drawing Sheets

900

400

600

APPARATUS AND METHOD FOR MANAGING A NETWORK

FIELD OF THE DISCLOSURE

The present disclosure relates generally to network communication and more specifically to an apparatus and method for managing a network.

BACKGROUND

Internet access can include communication across multiple networks or internet service providers that each independently control their own network activity, such as through various network policies. Border gateway protocol is a routing protocol utilized for control of internet traffic which allows for decentralized routing. The internet service providers can utilize border gateway protocol to establish routing between one another through border or edge routers in communication with each other.

DETAILED DESCRIPTION

One embodiment of the present disclosure entails computer-readable storage medium, having computer instructions for obtaining Border Gateway Protocol (BGP) messages associated with a plurality of networks, determining route changes based on the BGP messages, updating route lists associated with each of the plurality of networks based on the route changes, comparing the route lists to detect discrepancies, and presenting alerts based on a detected discrepancy.

Another embodiment of the present disclosure entails a server having a controller to capture routing data representative of routing changes associated with a plurality of networks, and compare the routing changes to detect discrepancies in route lists associated with the plurality of networks.

Yet another embodiment of the present disclosure entails a server having a controller to obtain BGP messages associated with a plurality of networks where the BGP messages include BGP advertise and withdraw messages, determine routing changes associated with each of the plurality of networks based on the BGP messages, and compare the routing changes to detect routing discrepancies associated with the plurality of networks.

Yet another embodiment of the present disclosure entails a server having a controller to capture routing data representative of routing changes associated with a plurality of networks where the routing data is obtained from one or more dedicated routers in communication with each of the plurality of networks, compare the routing changes to detect discrepancies in route lists associated with the plurality of networks; and present alerts based on a detected discrepancy.

Yet another embodiment of the present disclosure entails a method including obtaining BGP messages associated with a plurality of networks, determining route changes based on the BGP messages, and comparing the route changes to detect discrepancies among route lists for the plurality of networks.

Figure 1:
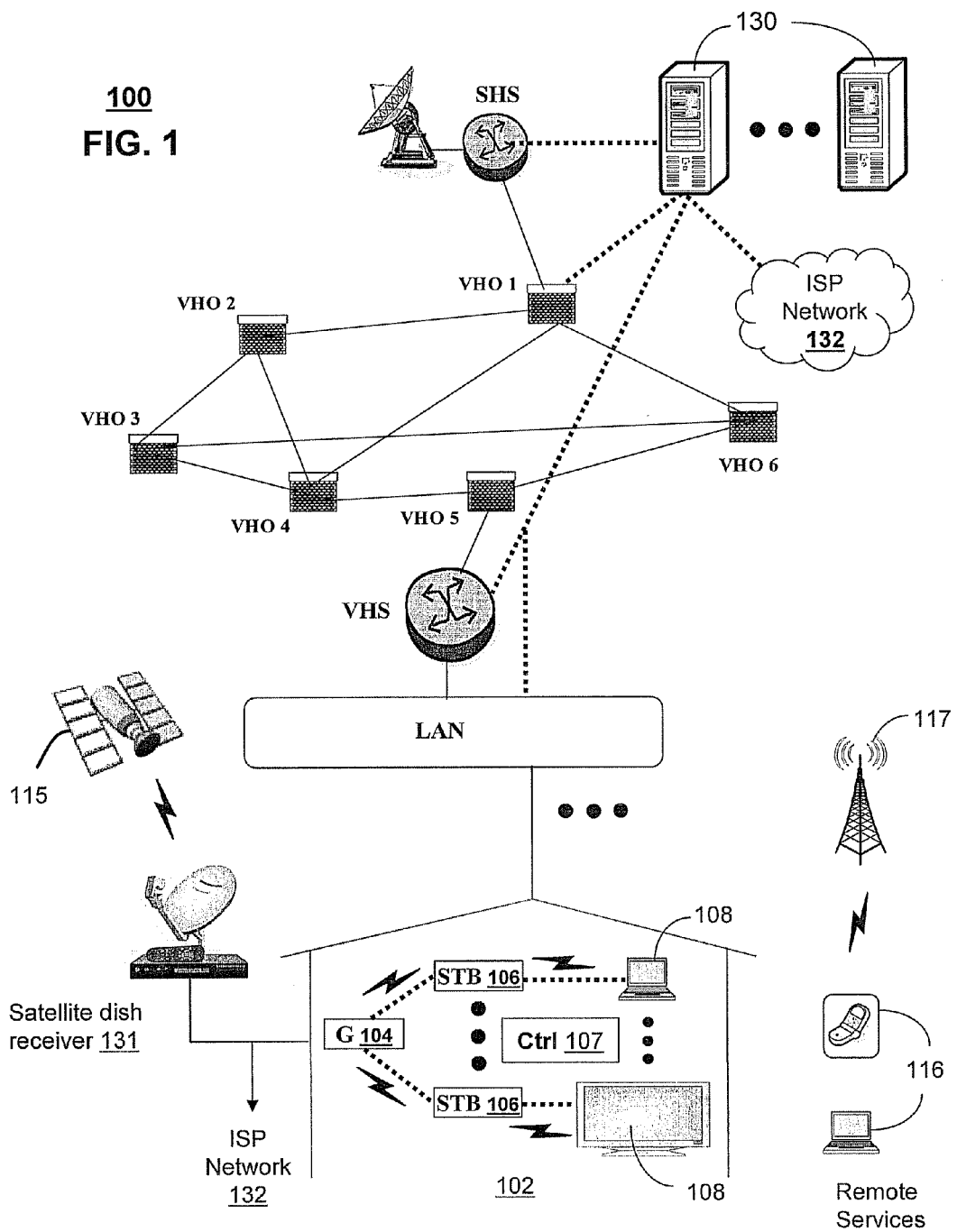
FIGS. 1-4 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBS) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
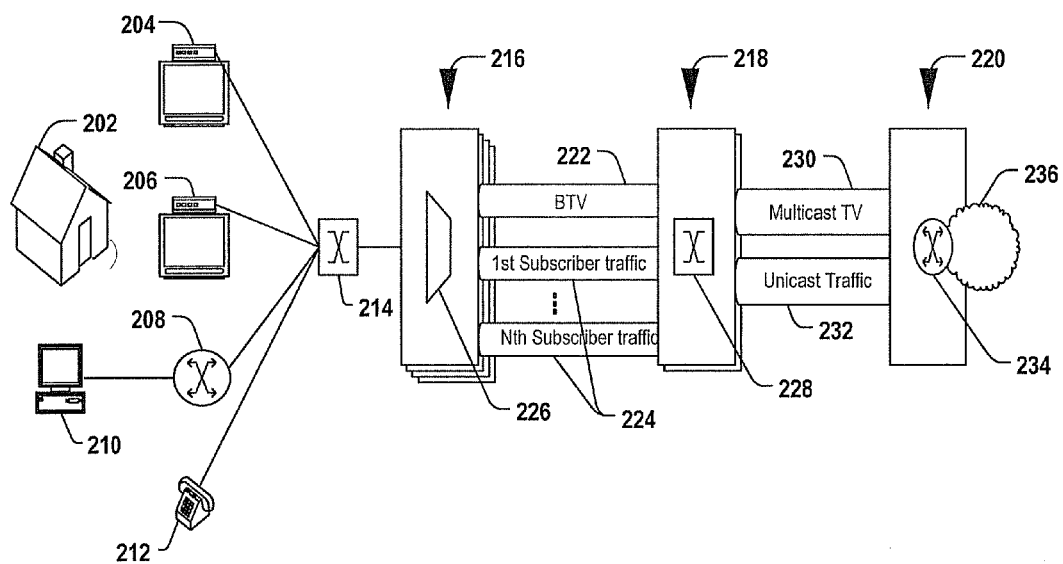

FIG. 2 depicts an illustrative embodiment of a second communication system 200 for delivering media content.

Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
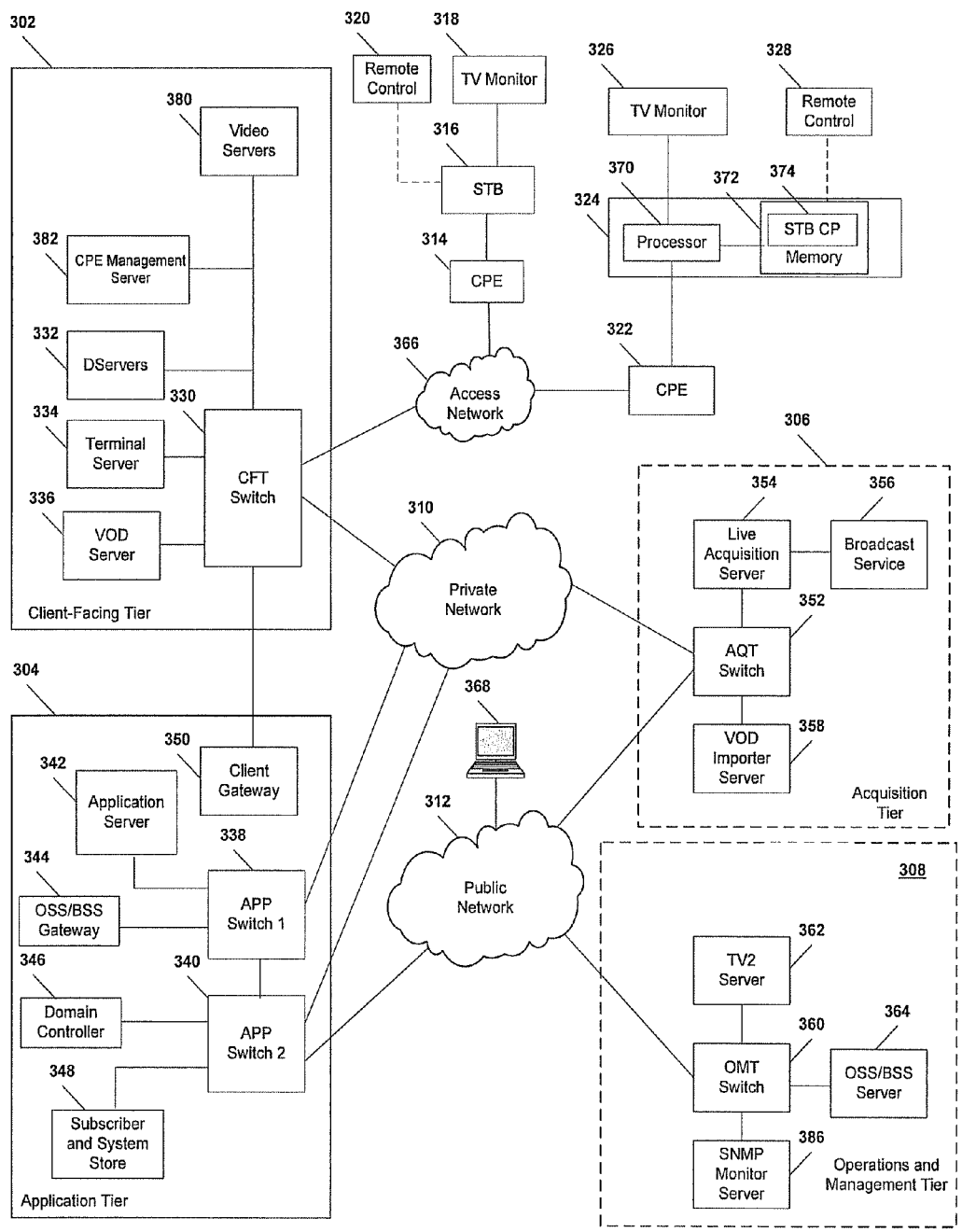

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
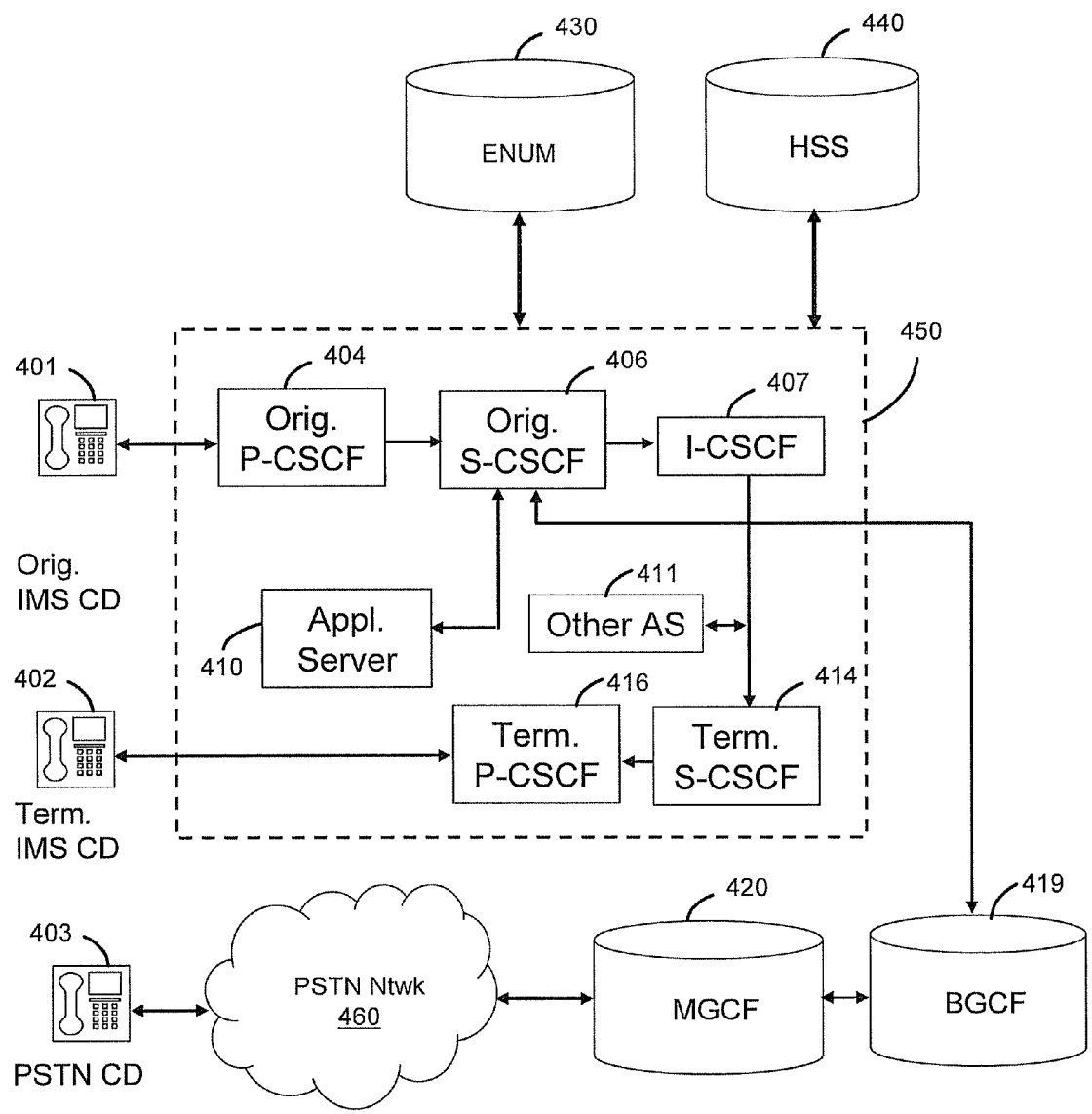

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
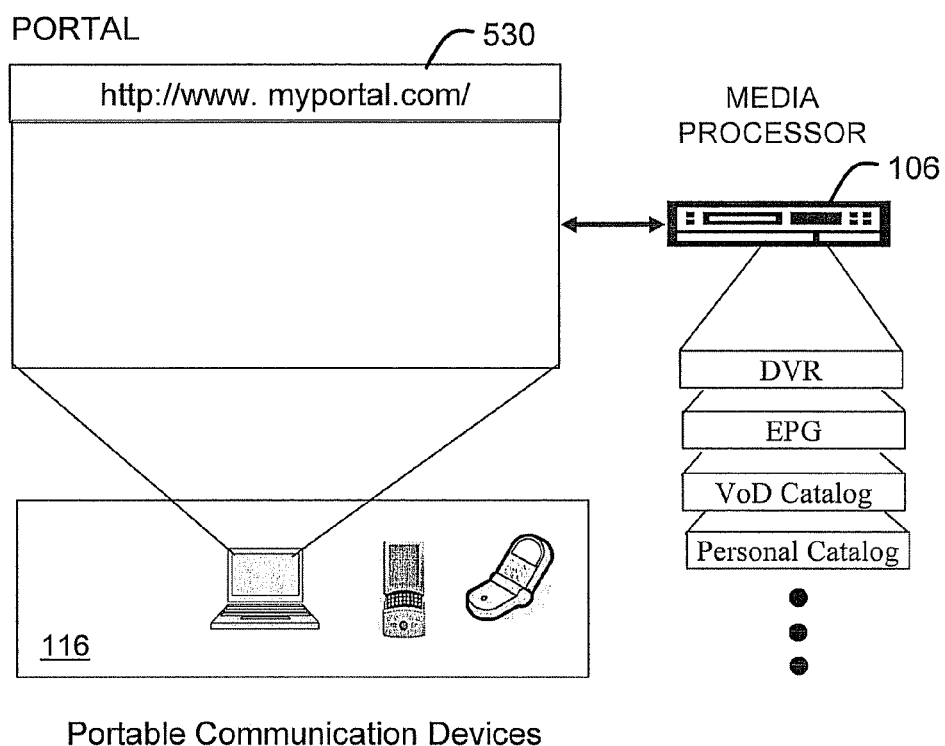
FIG. 5 depicts an illustrative embodiment of a portal interacting with at least one among the communication systems of FIGS. 1-4.

FIG. 5 depicts an illustrative embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
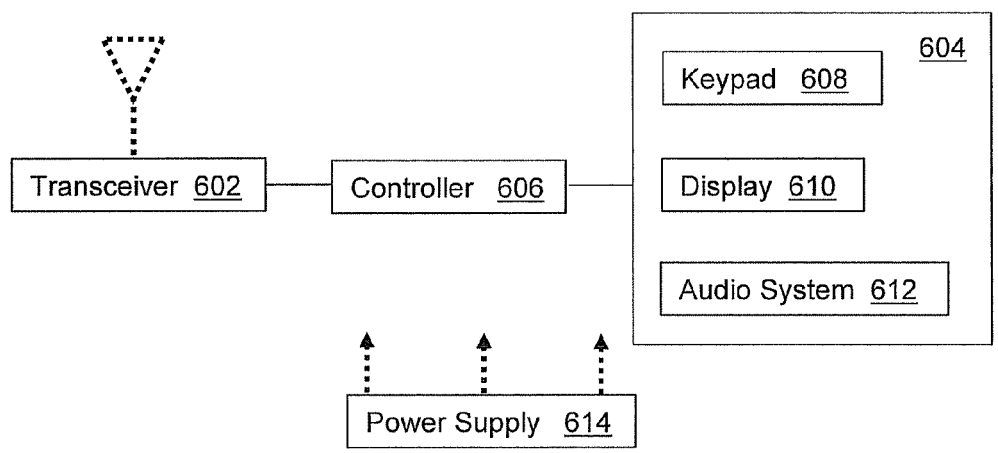
FIG. 6 depicts an illustrative embodiment of a communication device utilized in the communication systems of FIGS. 1-4.

FIG. 6 depicts an exemplary embodiment of a communication device 600. Communication device 600 can be a representative portion of any of the aforementioned communication devices of FIGS. 1-4. The communication device 604 can comprise a wireline and/or wireless transceiver 602 (herein transceiver 602), a user interface (UD) 604, a power supply 614, and a controller 606 for managing operations thereof. The transceiver 602 can support short-range or long-range wireless access technologies such as a Bluetooth wireless access protocol, a Wireless Fidelity (WiFi) access protocol, a Digital Enhanced Cordless Telecommunications (DECT) wireless access protocol, cellular, software defined radio (SDR) and/or WIMAX technologies, just to mention a few. Cellular technologies can include, for example, CDMA-1X, UMTS/HSDPA, GSM/GPRS, TDMA/EDGE, EV/DO, and next generation technologies as they arise.

The transceiver 602 can also support common wireline access technologies such as circuit-switched wireline access technologies, packet-switched wireline access technologies, or combinations thereof. PSTN can represent one of the common circuit-switched wireline access technologies. Voice over Internet Protocol (VoIP), and IP data communications can represent some of the commonly available packet-switched wireline access technologies. The transceiver 602 can also be adapted to support IP Multimedia Subsystem (IMS) protocol for interfacing to an IMS network that can combine PSTN and VoIP communication technologies.

The UI 604 can include a depressible or touch-sensitive keypad 608 and a navigation mechanism such as a roller ball, joystick, and/or navigation disk for manipulating operations of the communication device 600. The UI 604 can further include a display 610 such as monochrome or color LCD (Liquid Crystal Display), OLED (Organic Light Emitting Diode) or other suitable display technology for conveying images to the end user of the communication device 600. In an embodiment where the display 610 is touch-sensitive, a portion or all of the keypad 608 can be presented by way of the display. The UI 604 can also include an audio system 612 that utilizes common audio technology for conveying low volume audio (e.g., audio heard only in the proximity of a human ear) and high volume audio (e.g., speakerphone for hands free operation). The audio system 612 can further include a microphone for receiving audible signals of an end user.

The power supply 614 can utilize common power management technologies such as replaceable and rechargeable batteries, supply regulation technologies, and charging system technologies for supplying energy to the components of the communication device 600 to facilitate long-range or short-range portable applications. The controller 606 can utilize computing technologies such as a microprocessor and/or digital signal processor (DSP) with associated storage memory such a Flash, ROM, RAM, SRAM, DRAM or other storage technologies.

Figure 7:
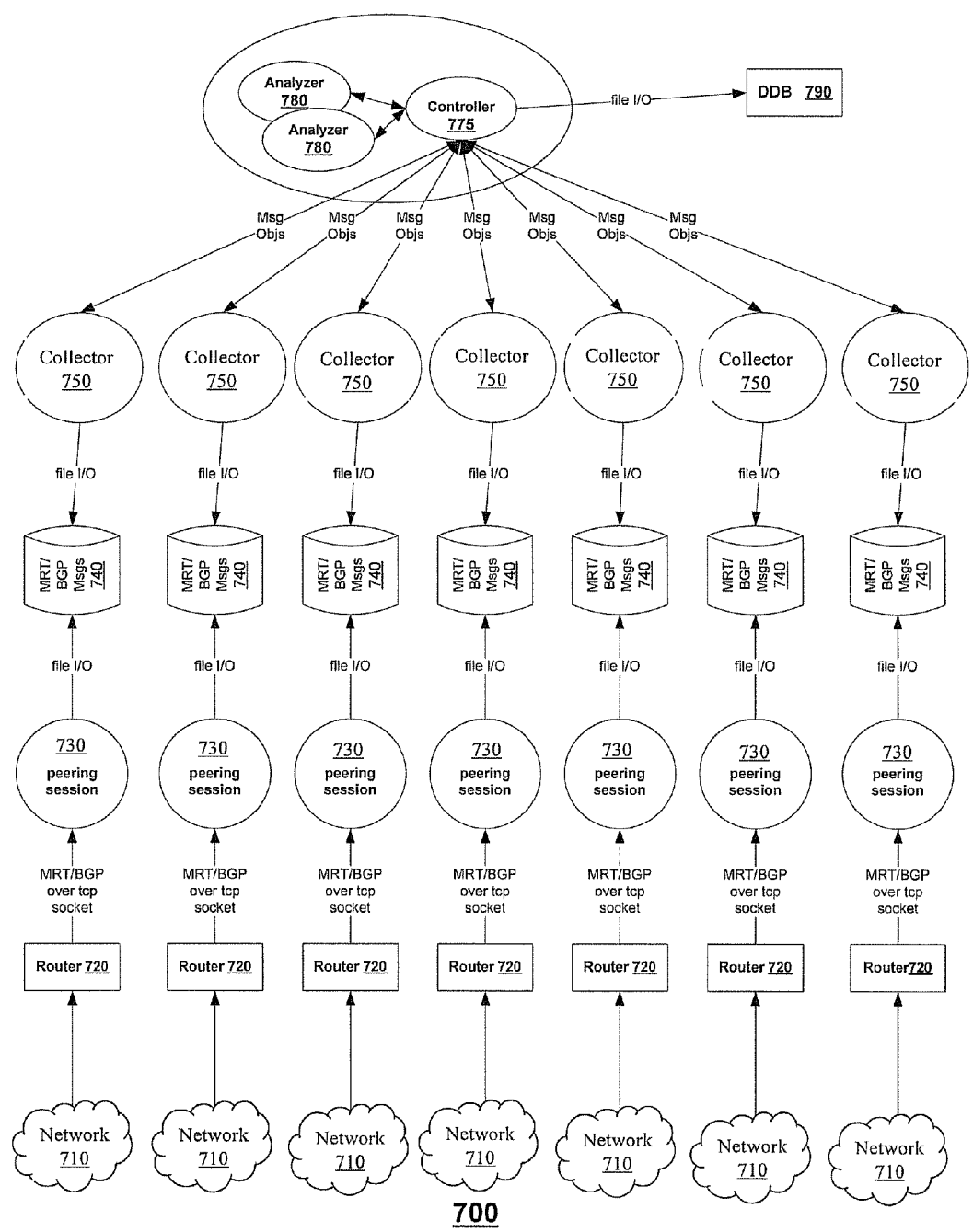
FIGS. 7-8 depict illustrative embodiments of communication systems that provide media services.

FIG. 7 depicts an illustrative embodiment of a communication system 700 that can be overlaid or operably coupled with communication systems 100-400 as another representative embodiment of said communication systems. Communication system 700 can incorporate, or be in communication with, one or more networks 710. In one embodiment, each of the networks 710 can be a separate service provider, such as ISP peers. System 700 can include one or more routers 720 in communication with each of the networks 710. For example, each of the networks 710 can have a dedicated router 720 that hold route information for the corresponding network. In one embodiment, system 700 can apply peering sessions 730 to each of the routers 720. In another embodiment, the peering sessions 730 can be process instances, such as in C programming language or other object oriented code, that maintain a passive or read-only BGP peering session with the dedicated routers 720. Each peering session 730 can capture routing messages associated with the networks 710. For instance, each of the peering sessions 730 can capture BGP advertise and withdraw messages 740 from the BGP peering stream and store the messages, such as in compressed files (e.g., gzip) on a disk. In another embodiment, system 700 can utilize a process instance that listens on the BGP port (179) for peering requests and can consult configuration files to determine whether it should respond by spawning a peering instance to participate in a requested session.

Collectors 750 can be utilized for gathering routing data, such as dedicated processes that are instructed by a controller 775 to assimilate the collected BGP advertise and withdraw messages 740. In one embodiment, the controller 775 can instruct the collectors 750 at the beginning of each cycle to assimilate the messages 740 that have accrued since the last cycle. The collectors 750 can construct and/or maintain a route table for the router 720, which can be updated once every cycle or at other desired intervals. In one embodiment, entries in the route table can be annotated to indicate changes since the last cycle, e.g., newly advertised and newly deleted routes can be made readily discernable during the cycle in which the change took place. In one embodiment, the BGP messages can be monitored in Multi-Threaded Routing Toolkit (MRT) format.

In another embodiment, the collectors 750 can also assess session continuity and react accordingly. For example, if a peering session is not running at the time of collection, the route table can be deemed invalid and made unavailable to requesters. In one embodiment, if a session is started or re-started, the assimilation of a new route table can be begun at the next time of collection, i.e., the beginning of the next cycle. In yet another embodiment, if the backlog of BGP messages cannot be assimilated within a given cycle, the collector 750 can declare the route table as incomplete and unavailable to requesters, and message processing can be continued in the next cycle.

In one embodiment, the controller 775 can be a separate process that functions as a single coordinator of route monitoring activity. For example, all collector activity can be initiated and controlled by the controller 775. However, the present disclosure contemplates other control configurations, including distributed and master-slave arrangements. In one embodiment, the controller 775 and collectors 750 can communicate via messages over sockets. In another embodiment, the controller 775 and each collector 750 can be run on its own separate hardware, such as resource needs dictate, including to support scalability and/or resiliency.

System 700 can have analyzers 780, such as threads that are spawned in the controller process, for applying analysis rules to route tables or route data. For example, the analysis rules can be applied to pairs of route tables from different networks. The pairs of route tables can be provided by the controller 775 when the analyzer 780 is initialized. In one embodiment, when the analyzer 780 completes a route table or data analysis, it can respond with a list of resulting alerts. The route tables can contain a readily identifiable indicia for discerning the route changes since the last cycle. When the analysis is complete, the controller 775 can correlate and assemble the alert information and publish it or otherwise present the alerts, including on a Download Data Block (DDB) 790, such as for consumption by a Real Time Transport Protocol Session Manager (RTPSM). In one embodiment, the analyzers 780 can perform event filtering and/or cycle-to-cycle event management. For example, events detected can be categorized through filtering in order to assist in determining particular anomalies being experienced. This information can be presented to various entities for event management. In another embodiment, the number of analyzers 780 can be equal to the number of reference routes lists multiplied by the number of peer routes lists. In another embodiment, the analyzers 780 may not re-detect previously detected events which persist but instead maintain a list of events from the previous cycle(s).

Figure 8:
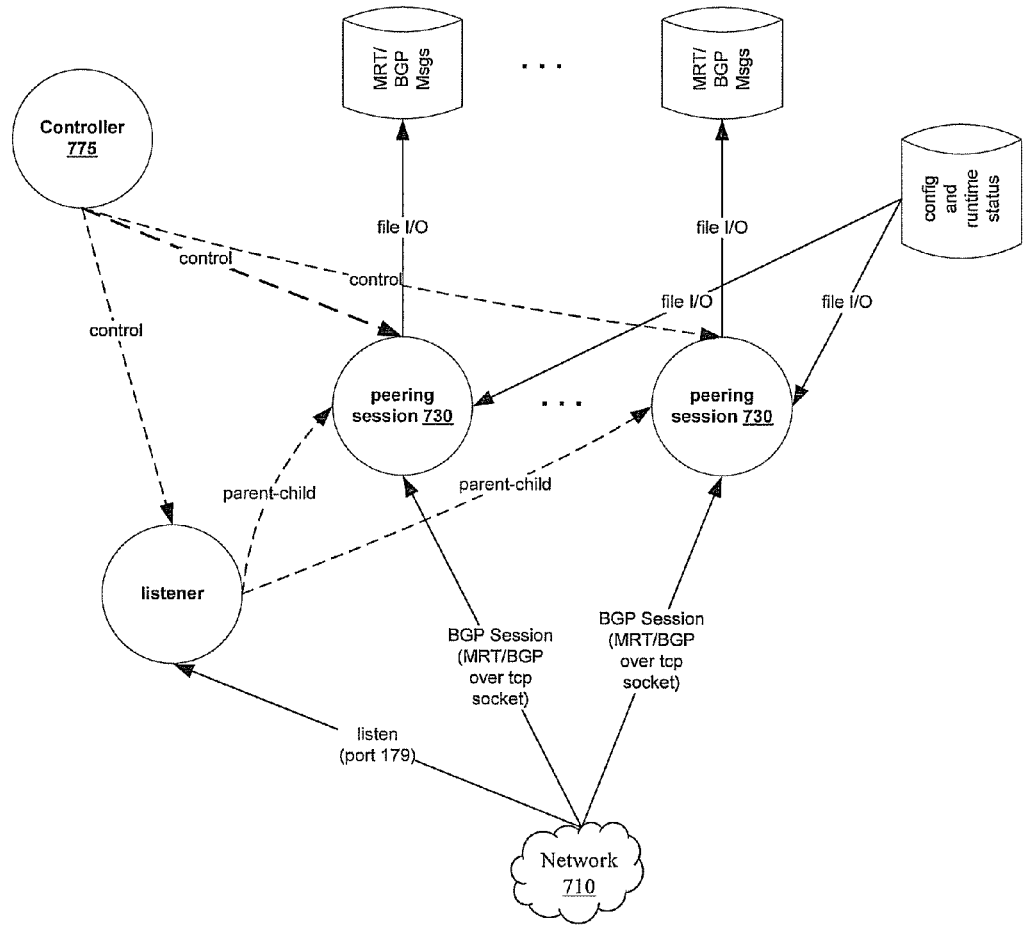

FIG. 8 depicts an illustrative embodiment of a communication system 800 that can be overlaid or operably coupled with communication systems 100-400 and 700 as another representative embodiment of said communication systems. System 800 can include or be in communication with one or more of the features of system 700, including an ISP network 710, a peering session 730 and a controller 775.

In one embodiment, the peering session 730 can be an object-oriented instance with no arguments. Once launched, the peering session can run continuously, listening for socket connections on port (179). When the peering session 730 receives a connection, it can spawn another instance of itself to handle the new socket session. In another embodiment, a new peering session instance can be established by looking for a configuration file for the session peer (e.g., pathname indicators can be utilized). The peering session instance can terminate if no configuration file is found. The appropriate configuration files can be created at the time of deployment of the system 800 for those routers or route reflectors to be monitored or otherwise included in the route monitoring activity. If a configuration file is found, the new session instance can then create a domain or real-time socket (e.g., in UNIX).

In one embodiment, the domain socket can support real-time access to collected data. The new session instance can then collaborate with the route reflector to complete the peering session setup. Once the session setup is complete, the session instance can then continuously process BGP update messages. In one embodiment, the peering session 730 can send messages at a time interval requested by a peering session initiator, e.g., the route reflector. When the first message is received, the peering session 730 can write its process identification and the current time to a file. When a BGP update message (e.g., route announce or route withdraw) is received, it can be written as is to both a current dump file for the session instance and to the domain socket for the session instance, if there is an active connection.

In one embodiment, each time a session instance is ready to write to a dump file, it can first check to see if the dump file rollover interval has expired, and if so, it can close and store the current dump file while creating a new dump file. The controller 775 can ensure that the parent is started with the user identification; can coordinate checking the status of and stopping the parent listener and all child peering processes; and can simplify checking the configuration.

Figure 9:
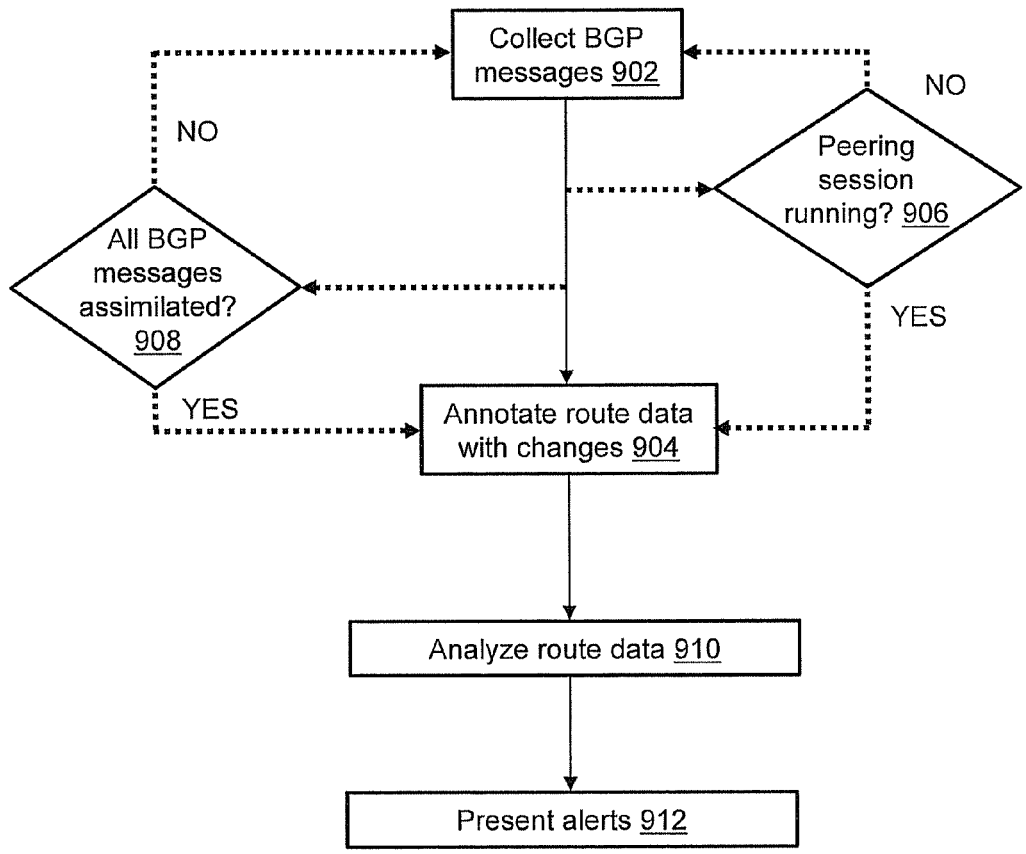
FIG. 9 depicts an illustrative embodiment of a method operating in portions of the communication systems of FIGS. 1-4 and 7-8.

FIG. 9 depicts an exemplary method 900 operating in portions of one or more of the communication systems 100-400 and 700. Method 900 has variants as depicted by the dashed lines. It would be apparent to an artisan with ordinary skill in the art that other embodiments not depicted in FIG. 9 are possible without departing from the scope of the claims described below.

Method 900 can begin with step 902 where route change data, such as BGP advertise and withdraw messages, are collected. The route change data can be captured using peering sessions 730 that monitor the activity of dedicated routers 720. In step 904, the route change data can be utilized to construct and/or maintain a route table associated with the particular network 710. Entries in the route table can be annotated to indicate changes since the last cycle. By monitoring route change data and assimilating the data to maintain an image of current route information, system 700 can reduce processing resources which would be used for gathering all route information.

In one embodiment in step 906, the continuity of data collection is ensured by determining whether the peering sessions where all running during a collection cycle. If data was properly captured then method 900 can annotate the route table or data with changes as in step 904. If on the other hand, a peering session was not running then the route table can be declared invalid and method 900 can return to step 902 for route change data capture. In another embodiment in step 908, method 900 can determine if all BGP messages or other route change data that is being monitored has been assimilated. If the data has not all been assimilated, such as due to heavy traffic and a backlog of BGP messages, then method 900 can return to step 902 for route change data capture. If on the other hand, all of the route change data has been assimilated, then method 900 can annotate the route table or data with changes as in step 904.

In step 910, an analysis of the route tables for each of the networks 710 can be performed to determine compatibility. For example, a pair of routes lists can be compared for compatibility where a first list is utilized as a reference list and the other list is compared thereto as the peer list. This process can be repeated for any number of peer lists and can be performed using the same reference list and/or different reference lists. In one embodiment, the routes on the reference list are single homed (i.e., each route on the reference list is advertised with the same Autonomous System Number (ASN) in its AS path). If discrepancies or other undesired conditions exist between the route tables, the controller 775 can present alerts as in step 912.

The analysis performed by analyzer 780 can be partitioned based on whether or not the route entry exists on either or both the reference list and the peer list, as depicted by the four quadrants in table 1. In addition, all possible status permutations of reference:peer route entry pairs for a given route are depicted in the quadrant in which they can occur:

TABLE 1

|  |  | Peer Route | |
| --- | --- | --- | --- |
|  |  | !exists | exists |
| Reference Route | !exists | old:old<br>old:none<br>none:old<br>none:none | old:new<br>old:current<br>none:new<br>none:current |
|  | exists | new:old<br>new:none<br>current:old<br>current:none | new:new<br>new:current<br>current:new<br>current:current |

Status values for the Ref_status:Peer_status pairs can be defined as follows: none is not new or current last cycle and not new or current this cycle; old is new or current last cycle but not new or current this cycle; current is new or current last cycle and current this cycle; and new is not new or current last cycle and new this cycle.
The stimulus for processing a route can come from a change in its advertised status, i.e., those occasions for which the status for the current cycle is either new or old, for the reference route, or for the peer route, or for both, so the set of pairs that are to be processed during the change-based analysis would be as follows:

TABLE 2

|  |  | Peer Route | |
| --- | --- | --- | --- |
|  |  | !exists | exists |
| Reference Route | !exists | old:old<br>old:none<br>none:old | old:new<br>old:current<br>none:new |
|  | exists | new:old<br>new:none<br>current:old | new:new<br>new:current<br>current:new |

In one embodiment, new reference routes can be processed by analyzing the matching current peer route. To eliminate redundant processing, a matching new peer route can be demoted to a current route, and a matching old peer route can be removed. Old reference routes can be processed by analyzing the matching current peer route. To eliminate redundant processing, a matching new peer route can be demoted to a current route, and a matching old peer route can be removed. New peer routes can be processed by analyzing the matching current reference route. Old peer routes can be processed by analyzing the matching current reference route. The corresponding analysis/processing for each of the status pairs can be determined by the quadrants of tables 1 and 2.

For the quadrant of !exists-!exists, processing does not need to be performed for this occurrence. In change-based analysis, this can represent the transition of routes to the unadvertised state, even though these routes don't exist in the current cycle. Where a route exists on neither list, such as an old:old case, this can indicate that the route was withdrawn in the same cycle by the networks being compared. The old: none and none:old cases can indicate a synchronization delay that straddles a cycle boundary. In one embodiment, removing the peer entry in old:old cases can eliminate redundant processing of none:old cases when encountered in a later phase of processing.

For the quadrant of exists-!exists, if there is no encompassing super route or if the encompassing super route does not contain the appropriate network AS, an event can be recorded. In one embodiment, removing the peer entry in new:old cases can eliminate redundant processing of current:old cases when encountered in a later phase of processing. For the quadrant of !exists-exists, if there is a super route that encompasses the peer route and is not matched by a peer super route, an event can be recorded. In one embodiment, demoting the peer entry to current in old:new cases can eliminate redundant processing of none:new cases in a later phase of processing. For the quadrant of exists-exists, these cases can be analyzed for an inconsistent AS Path and AS Path length events. In one embodiment, demoting the peer entry to current in new:new cases can eliminate redundant processing of current:new cases in a later phase of processing.

Upon reviewing the aforementioned embodiments, it would be evident to an artisan with ordinary skill in the art that said embodiments can be modified, reduced, or enhanced without departing from the scope and spirit of the claims described below. For example, the routing monitoring can be applied to network activity associated with various forms of media including IPTV, VoIP, and so forth. As another example, data representative of route changes other than, or in addition to, BGP messages can be monitored in order to maintain the routing tables for the corresponding networks. Other configurations of components can be utilized for capturing the route change data, including a plurality of routers in communication with each of the networks or non-dedicated routers. The present disclosure contemplates routing discrepancies being based on a number of factors, such as the failure of a peer to advertise a route or an encompassing super route, advertising of a route with a contradicting AS path, advertising of a route with a number of hops being above a threshold, advertising only a subnet of the route, and so forth.

Other suitable modifications can be applied to the present disclosure without departing from the scope of the claims below. Accordingly, the reader is directed to the claims section for a fuller understanding of the breadth and scope of the present disclosure.

Figure 10:
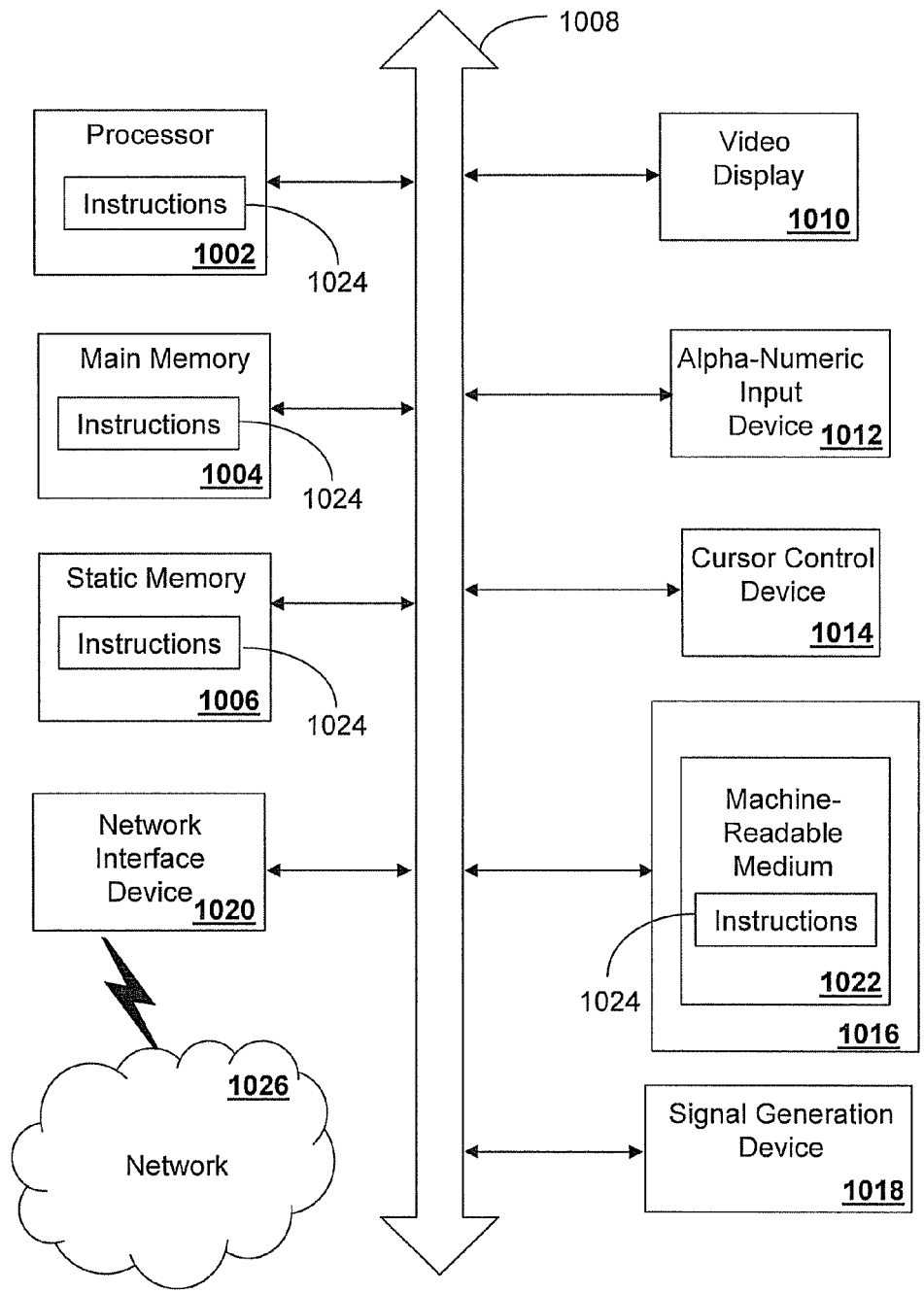
FIG. 10 is a diagrammatic representation of a machine in the form of a computer system within which a set of instructions, when executed, may cause the machine to perform any one or more of the methodologies discussed herein.

FIG. 10 depicts an illustrative diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a computer-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 so that a device connected to a network environment 1026 can send or receive voice, video or data, and to communicate over the network 1026 using the instructions 1024. The instructions 1024 may further be transmitted or received over a network 1026 via the network interface device 1020.

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform anyone or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions for:
    obtaining Border Gateway Protocol (BGP) messages associated with a plurality of networks;
    determining route changes based on the BGP messages;
    updating routing instructions in routing tables associated with each of the plurality of networks based on the route changes, wherein the updating is performed once per collection cycle;
    determining whether all peering sessions are running during the collection cycle;
    declaring a routing table as invalid when a peering session fails to run during the collection cycle;
    comparing the routing tables to detect discrepancies;
    presenting alerts based on a detected discrepancy;
    annotating the routing tables with the route changes from a current monitoring cycle;
    spawning threads to compare the routing tables to detect the discrepancies wherein the threads are spawned in a centralized controller; and
    presenting the alerts to a Real Time Transport Protocol Session Manager for consumption by the Real Time Transport Protocol Session Manager, wherein event management based on the alerts is performed for each collection cycle.

2. The non-transitory computer-readable storage medium of claim 1, comprising computer instructions for:
    obtaining the BGP messages through monitoring of one or more dedicated routers in communication with each of the plurality of networks, wherein the routing tables are stored in the one or more dedicated routers; and
    declaring the routing tables invalid when all of the routing instructions are not analyzed during the collection cycle.

3. The non-transitory computer-readable storage medium of claim 1, wherein the BGP messages are BGP advertise and withdraw messages.

4. The non-transitory computer-readable storage medium of claim 1, comprising computer instructions for maintaining a list of alerts from a previous monitoring cycle.

5. The non-transitory computer-readable storage medium of claim 1, comprising computer instructions for:
    obtaining the BGP messages utilizing peering sessions for one or more dedicated routers in communication with each of the networks; and
    determining a validity of at least one of the routing tables based on a commencement time of at least one of the peering sessions.

6. The non-transitory computer-readable storage medium of claim 1, comprising computer instructions for determining a validity of at least one of the routing tables based on an assimilation of all of the BGP messages associated with the at least one of the routing tables.

7. A server comprising:
a memory; and
a controller to:
    capture routing data representative of routing changes associated with a plurality of networks;
    compare the routing changes to detect discrepancies in route lists associated with the plurality of networks;
    update route tables associated with each of the plurality of networks based on the routing changes, wherein the update is performed once per collection cycle;
    determine whether all peering sessions are running during the collection cycle;
    declare a routing table as invalid when a peering session fails to run during the collection cycle;
    annotating the routing tables with the route changes from a current monitoring cycle;
    spawning threads to compare the routing tables to detect the discrepancies, wherein the threads are spawned in a centralized controller; and
    presenting the alerts to a Real Time Transport Protocol Session Manager for consumption by the Real Time Transport Protocol Session Manager, wherein event based on the alerts is performed for each collection cycle.

8. The server of claim 7, wherein the route tables are stored in one or more dedicated routers and wherein the route tables are declared invalid when all of the routing data has not been analyzed during the collection cycle.

9. The server of claim 7, wherein the controller is adapted to monitor Border Gateway Protocol (BGP) messages to capture the routing data.

10. The server of claim 9, wherein the BGP messages are BGP advertise and withdraw messages.

11. The server of claim 7, wherein the controller is adapted to present alerts based on a detected discrepancy.

12. The server of claim 11, wherein the controller is adapted to obtain the routing data through monitoring of one or more dedicated routers in communication with each of the plurality of networks.

13. The server of claim 12, wherein the controller is adapted to maintain a list of alerts from a previous monitoring cycle.

14. A server comprising:
a memory; and
a controller to:
    obtain Border Gateway Protocol (BGP) messages associated with a plurality of networks, the BGP messages comprising BGP advertise and withdraw messages;
    determine routing changes associated with each of the plurality of networks based on the BGP messages;
    update routing tables associated with each of the plurality of networks based on the routing changes, wherein the update is performed once per collection cycle;
    determine whether all peering sessions are running during the collection cycle;
    declare the routing tables as invalid when a peering session fails to run during the collection cycle;
    compare the routing changes to detect routing discrepancies associated with the plurality of networks;
    annotating the routing tables with the route changes from a current monitoring cycle;
    spawning threads to compare the routing tables to detect the discrepancies wherein the threads are spawned in a centralized controller; and
    presenting the alerts to a Real Time Transport Protocol Session Manager for consumption by the Real Time Transport Protocol Session Manager, wherein event management based on the alerts performed for each collection cycle.

15. The server of claim 14, wherein the controller is adapted to present alerts based on a detected routing discrepancy.

16. The server of claim 15, wherein the controller is adapted to obtain the BGP messages through monitoring of one or more dedicated routers in communication with each of the plurality of networks.

17. The server of claim 15, wherein the controller is adapted to maintain a list of alerts from a previous monitoring cycle.

18. A server comprising:
a memory; and
a controller to:
capture routing data representative of routing changes associated with a plurality of networks, the routing data being obtained from one or more dedicated routers in communication with each of the plurality of networks;
update routing tables associated with each of the plurality of networks based on the routing changes, wherein the update is performed once per collection cycle;
ensure continuity of routing data capture by determining whether all peering sessions are running during the collection cycle;
declare at least one of the routing tables as invalid when a peering session fails to run during the collection cycle;
compare the routing changes to detect discrepancies in route lists associated with the plurality of networks;
present alerts based on a detected discrepancy;
annotating the routing tables with the route changes from a current monitoring cycle;
spawning threads to compare the routing tables to detect the discrepancies, wherein the threads are spawned in a centralized controller; and
presenting the alerts to a Real Time Transport Protocol Session Manager for consumption by the Real Time Transport Protocol Session Manager, wherein event management based on the alerts is performed for each collection cycle.

19. The server of claim 18, wherein the routing data is Border Gateway Protocol (BGP) messages associated with a plurality of networks, the BGP messages comprising BGP advertise and withdraw messages.

20. The server of claim 19, wherein the controller is adapted to:
capture the routing data utilizing peering sessions for the one or more dedicated routers; and
determine a validity of at least one of the route lists based on a commencement time of at least one of the peering sessions.

21. The server of claim 19, wherein the controller is adapted to determine a validity of at least one of the route lists based on an assimilation of all of the BGP messages associated with the at least one of the route lists.

22. A method, comprising:
obtaining Border Gateway Protocol (BGP) messages associated with a plurality of networks;
determining route changes based on the BGP messages;
updating routing tables of one or more dedicated routers associated with each of the plurality of networks based on the route changes, wherein the updating is performed once per collection cycle;
determining whether all peering sessions are running during a collection cycle;
declaring a routing table as invalid when a peering session fails to run during the collection cycle;
comparing the route changes to detect discrepancies among route lists for the plurality of networks;
annotating the routing tables with the route changes from a current monitoring cycle;
spawning threads to compare the routing tables to detect the discrepancies, wherein the threads are spawned in a centralized controller; and
presenting the alerts to a Real Time Transport Protocol Session Manager for consumption by the Real Time Transport Protocol Session Manager, wherein event management based on the alerts is performed for each collection cycle.

23. The method of claim 22, comprising presenting alerts based on a detected discrepancy.

24. The method of claim 22, comprising obtaining the BGP messages through monitoring of the one or more dedicated routers in communication with each of the plurality of networks.

* * * * *